United States Patent
Shigetomi et al.

(10) Patent No.: US 9,365,282 B2
(45) Date of Patent: Jun. 14, 2016

(54) METHOD OF REPAIRING COMPOSITE MATERIAL AND COMPOSITE MATERIAL

(71) Applicant: MITSUBISHI AIRCRAFT CORPORATION, Aichi (JP)

(72) Inventors: Toshikazu Shigetomi, Tokyo (JP); Masayoshi Suhara, Tokyo (JP); Morimasa Ishida, Tokyo (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/079,952

(22) Filed: Nov. 14, 2013

(65) Prior Publication Data

US 2014/0141190 A1    May 22, 2014

(30) Foreign Application Priority Data

Nov. 20, 2012  (JP) .................................. 2012-253983

(51) Int. Cl.
*B29C 73/00* (2006.01)
*B32B 43/00* (2006.01)
(Continued)

(52) U.S. Cl.
CPC . *B64C 3/26* (2013.01); *B29C 73/06* (2013.01); *B29C 73/10* (2013.01); *B29C 73/26* (2013.01); *B64F 5/0081* (2013.01); *B29C 2073/264* (2013.01); *B29C 2073/268* (2013.01);
(Continued)

(58) Field of Classification Search
CPC ........ B29C 73/00; B29C 73/04; B29C 73/10; B29C 73/105; B29C 73/12; B29C 73/06; B29C 2073/264; B29C 2073/268; B64F 5/0081; B32B 37/1009; B32B 38/10

USPC .............. 156/60, 94, 98, 153, 250, 252, 256, 156/257, 258, 263, 264, 265, 267, 285, 286, 156/293, 294, 297, 298, 299, 300, 303.1, 156/307.1, 307.3; 428/63, 113, 114, 131, 428/137, 297.4, 299.1
See application file for complete search history.

(56) References Cited

U.S. PATENT DOCUMENTS

| | | | |
|---|---|---|---|
| 5,958,166 A | * | 9/1999 | Walters et al. .................. 156/94 |
| 2001/0008161 A1 | * | 7/2001 | Kociemba et al. .............. 156/94 |

(Continued)

OTHER PUBLICATIONS

DOT/FAA/AR-08/54 "Guidlines for the Development of a Critical Composite Maintenance and Repair Issues Awareness Course" Feb. 2009, U.S. Department of Transportation Federal Aviation Administration., pp. A-135, 136 (Fig. A-25).

*Primary Examiner* — Philip Tucker
*Assistant Examiner* — Brian R Slawski
(74) *Attorney, Agent, or Firm* — Pearne & Gordon LLP

(57) ABSTRACT

A method of repairing a composite material is provided in which a frustum-shaped portion of a composite material is removed, and the composite material and a repair material are bonded with each other while evacuating. The repair method includes step S2 of removing a damaged part 11 from the front side so as to pass through in the thickness direction while leaving a support wall protruding inward in the radial direction from the periphery of the top face of the frustum-shaped portion; step S3 of sealing the back side by placing a sealing plate, which is inserted from the front side into a through hole formed by the removing step, on the support wall; step S5 of placing the repair material through an adhesive on the composite material where the frustum-shaped portion has been removed; and step S6 of evacuating in a state in which the front side is sealed.

15 Claims, 6 Drawing Sheets

(51) Int. Cl.
- *B29C 65/00* (2006.01)
- *B32B 37/00* (2006.01)
- *B32B 38/10* (2006.01)
- *B32B 38/04* (2006.01)
- *B32B 3/26* (2006.01)
- *B64C 3/26* (2006.01)
- *B29C 73/06* (2006.01)
- *B29C 73/10* (2006.01)
- *B29C 73/26* (2006.01)
- *B64F 5/00* (2006.01)
- *B32B 37/10* (2006.01)

(52) U.S. Cl.
CPC ............. *B32B37/1009* (2013.01); *B32B 38/10* (2013.01); *Y10T 428/20* (2015.01)

(56) References Cited

U.S. PATENT DOCUMENTS

| | | | |
|---|---|---|---|
| 2009/0053406 A1* | 2/2009 | Ackerman | B29C 73/10 427/142 |
| 2012/0152438 A1* | 6/2012 | Benthien et al. | 156/83 |
| 2012/0305169 A1* | 12/2012 | Hanks et al. | 156/98 |

* cited by examiner

METHOD OF REPAIRING COMPOSITE MATERIAL AND COMPOSITE MATERIAL

BACKGROUND

1. Technical Field

The present invention relates to a method of repairing a composite material, and also to a composite material having been repaired.

2. Related Art

As a skin forming the outer face of an aircraft wing, a composite material that is composed of laminated plural sheets of CFRP (Carbon Fiber Reinforced Plastics) or the like has been used.

The skin is arranged on the front and back sides of the wing with a distance therebetween, and is constructed in a box shape together with spars that form the front and rear edges of the wing, respectively. The boxed space is provided with ribs for supporting the skin on the front and back sides, and is utilized for housing various devices and fuel.

Incidentally, when the skin is damaged due to undergoing an impact, repair becomes necessary. The repair is made in a manner in which the damaged part suffered laminate exfoliation due to the impact is removed, and a concave portion formed by removing the damaged part is filled with a composite material. It is desirable to carry out the repair without disassembling the box-shaped structural body.

If the damage does not reach the back side of the skin, it is possible to repair the structural body by approaching from the front side (one side) of the skin without disassembling the structural body.

For example, onto the concave portion formed by that the damaged part is removed from the front side, a semi-hardened repair material, which is a similar composite material as the skin and is overlaid on a film-like adhesive, is placed. The repair material can be bonded to the composite material by heating and curing the repair material after the repair material and the composite material get close contact with each other through the adhesive by being evacuated from the front side. Since it is desirable that the concave portion of the composite material has a shape equalized in every direction in order to avoid stress concentration, the concave portion is formed in a mortar shape, the plan view of which is circular, through scarf machining.

On the other hand, if the damage has reached the back side of the skin, the concave portion formed by removal of the damaged part passes through the composite material in the thickness direction, and a through hole having openings on both front and back sides is formed. It therefore becomes necessary to block the opening on the back side in advance of evacuation, which needs a worker to enter to the back side. However, if it is not possible for the worker to enter the boxed space, the structural body has to be disassembled.

A method of blocking the back side opening of a through hole by forming the through hole and a patch for blocking thereof in an oval shape is described in Aircraft Icing Handbook, Report #DOT/FAA/AR-08/54 Composite Maintenance and Repair Issues. In contrast to the case in which the through hole and the patch are formed in circular shapes having substantially identical diameters, it becomes possible to cause the patch to be delivered to the back side by vertically orienting the patch such that the short axis of the patch meets the long axis of the through hole. Then, the through hole is sealed by the patch that is turned on the back side.

SUMMARY

According to the method of Aircraft Icing Handbook, Report #DOT/FAA/AR-08/54 Composite Maintenance and Repair Issues, a through hole formed in the composite material by removal of a damaged part has to be of an oval shape. There is, however, such a problem with this method that it takes time and labor to form an oval-shaped through hole. Furthermore, since an investigation on the strength of repair parts in each product in order to determine the orientation of the oval hole, it takes time until beginning the repair work.

For these reasons, it is difficult to adopt the method of forming an oval-shaped through hole.

The present invention has been made in view of the above problems, and an object of the invention is to provide a practical method of repairing a composite material by approaching from one side when a damage extends across the entire thickness thereof.

The method of repairing a composite material of the invention is such that, in a plate-shaped composite material made of fibers and resin, a frustum-shaped portion having a diameter enlarging from the back side toward the front side is removed, and a repair material replaced with the removed portion is bonded to the composite material.

The repair method of the invention includes the steps of: removing at least a first part of the composite material; sealing the back side; placing the repair material through an adhesive on the composite material where the frustum-shaped portion has been removed; and evacuating in a state in which the front side is sealed.

The invention is characterized in that a first portion extending from the top face so as to include at least the projected area of the top face on the bottom of the frustum-shaped portion is removed from the front side so as to pass through the composite material in the thickness direction while leaving a support wall protruding inward in the radial direction from the periphery of the top face of the frustum-shaped portion in the step of removing, and the back side is sealed by placing a sealing plate, which is inserted from the front side into the through hole formed by the removing step, on the support wall in the step of sealing.

According to the invention, the repair can be carried out only from one side (the front side). In the invention, one side of the composite material to which a repair worker faces is denoted as the front side, and the reverse side is denoted as the back side.

In the invention, by removing a damaged part from the composite material while leaving the support wall positioned on the back side of the composite material and by placing the sealing plate on the support wall, the back side of the composite material with a through hole which has been formed in the removing step is sealed. Therefore, it is not necessary to form an oval-shaped through hole as in the conventional method and to bond a patch, which is delivered through the through hole, on the back side of the composite material. Since it is possible to render the shape of the through hole to be a perfect circle, which can be formed using a tool for general purpose use, in the invention, the strength investigation for determining the orientation of the oval hole and the troublesome process of forming the oval hole becomes unnecessary. The repair time can thereby be shortened and the repair costs can also be reduced.

When repairing a composite material having been damaged across the entire thickness, since the repair can be carried out without disassembling the structural body even when any space for allowing a worker to enter the back side is not available, the repair can be carried out at a reduced cost.

In the step of removing of the invention, it is desirable to remove a cylindrical portion extending from the top face to the projected area of the top face on the bottom of the frustum-shaped portion of the composite material, and to remove the remaining portion of the frustum-shaped portion after the sealing plate has been placed on the support wall.

Since the surface of the sealing plate becomes a guide face for guiding a tool, the forming is facilitated.

In the method of repairing a composite material of the invention, the sealing plate may have a sealing plate wall slope having a diameter enlarging from the back side toward the front side and the support wall may have a support wall slope facing to the sealing plate slope.

Accordingly, stresses arising in the composite material can be dispersed by the slopes of the sealing plate and support wall, and stress concentration can be avoided even in the case in which the sealing plate cannot be thinned for the reason of securing strength, and the height of bonded face between the composite material and the repair material, which are scarf jointed, cannot not be secured, stress concentration can be avoided.

In the step of removing in the invention, as well as removal of the frustum-shaped portion of the composite material, the periphery of the frustum-shaped through hole formed by the removal on the back side is rendered to be the support wall.

Since the support wall and the bonding face of the composite material bonded with the repair material can be formed at one time of scarf machining, the repair can be facilitated.

The present invention holds also for a repaired composite material.

The composite material of the invention is made of fibers and resin in a plate shape and is repaired by being bonded with a repair material placed in a through hole passing through in a thickness direction.

The invention is characterized in that the repair material formed in a frustum shape having a diameter enlarging from a back side toward a front side, and a sealing plate facing to a top face of the repair material are placed in the through hole, and the sealing plate seals the back side of the through hole by being placed on a support wall that is formed integrally with the composite material at a backward position with respect to the sealing plate.

The composite material of the invention is preferable such that the sealing plate has a sealing plate wall slope having a diameter enlarging from the back side toward the front side and the support wall has a support wall slope facing to the sealing plate slope.

The composite material of the invention described above is desirable to constitute a skin of an aircraft.

The wings and fuselage of an aircraft each include a skin and support members for supporting the skin. Since there are the support members, fuel tanks, various devices and the like in the wings and fuselage, it is difficult to repair a skin from the inside. Accordingly, when the composite material of the invention is used for the skin of an aircraft, the effect of the invention enabling the repair by approaching only from one side is significant.

According to the repair method of the invention, a practical repair method by approaching from one side in the case in which damage extends across the entire thickness of a composite material can be provided.

The composite material of the invention also can benefit from similar advantages.

DETAILED DESCRIPTION

The present invention will be described in detail below on the basis of the embodiments shown in the attached drawings.

First Embodiment

An explanation will be given as to a method of repairing a damaged composite material by approaching from one side (the front side) and a repaired composite material.

A composite material 10 to be repaired is composed of laminated plural sheets of CFRP. It is possible to use fiber reinforced plastics such as GFRP (Glass Fiber Reinforced Plastics) or the like instead of the CFRP.

This composite material 10 forms a skin serving as the outer face of main wings and tail unit of an aircraft, and constructs a structural body by being assembled together with spars and ribs.

The repair is carried out without disassembling the structural body.

Figure 1:
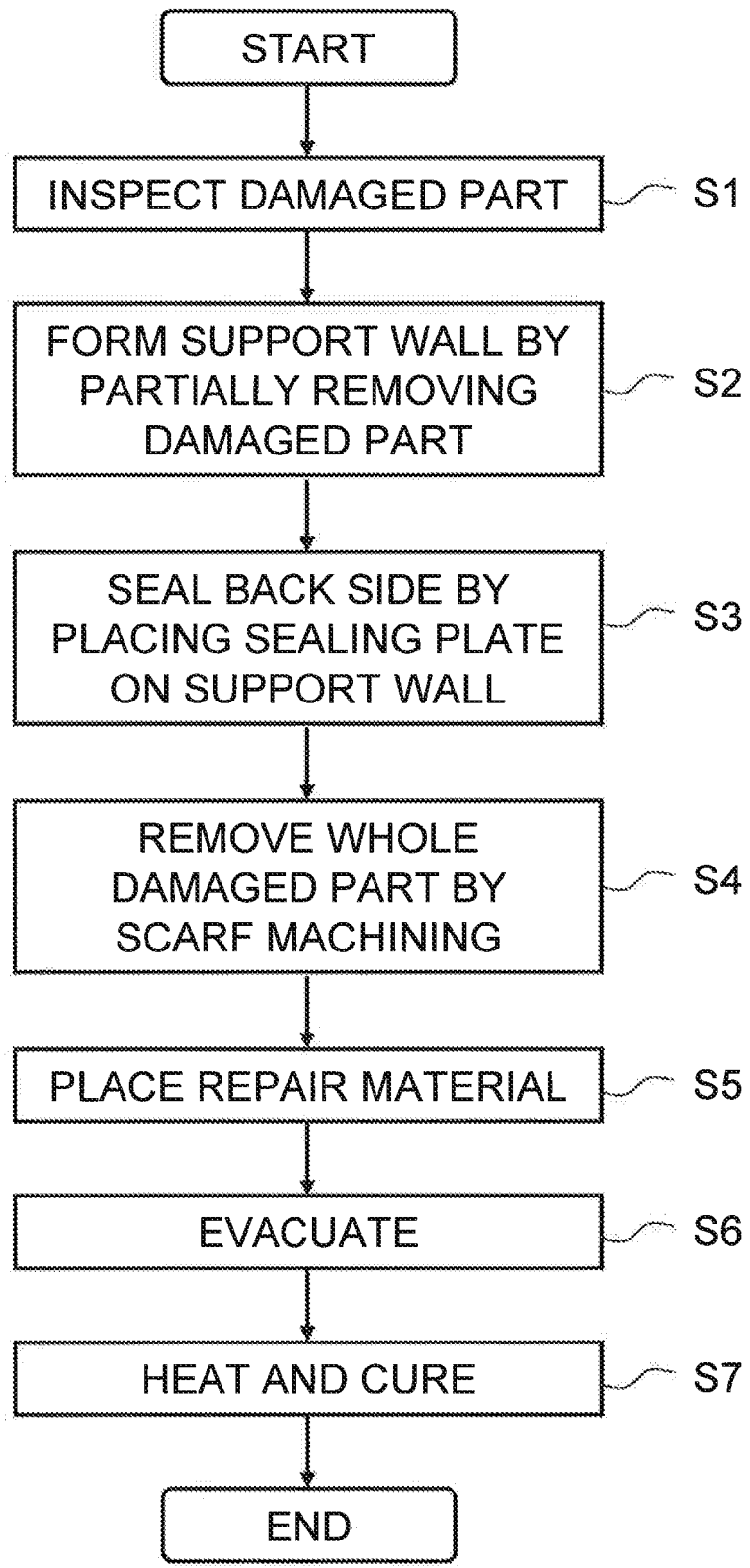
FIG. 1 is a flowchart showing steps of a method of repairing a composite material according to a first embodiment.

First, a damaged part 11 of the composite material 10 is subjected to an ultrasonic inspection (step S1) as shown in FIG. 1. The ultrasonic inspection can be carried out from the front side 10A of the composite material 10 (from the outside of the box) by use of a known device and method.

Figure 2A:
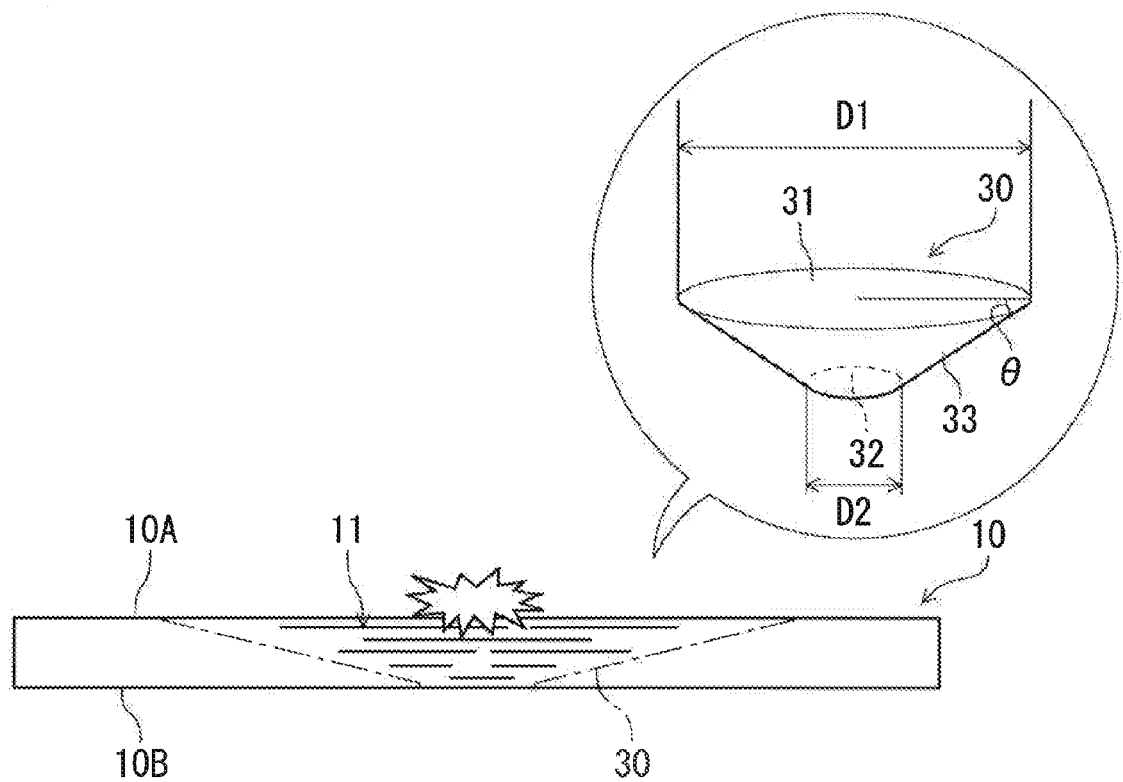
FIGS. 2A to 2C are cross-sectional views showing steps of repairing a composite material.

There are plural places suffered laminate exfoliation in the damaged part 11 as schematically shown in FIG. 2A. The area where the exfoliation has occurred is narrowed down through the above inspection. A frustum-shaped portion (indicated with a chain line) in the area, which has its bottom face on the front side 10A, is removed. The repair is designed in accordance with the inspection results such that all places suffered laminate exfoliation are included in the range of a conical frustum 30 and the composite material 10 is able to endure the stress to be applied thereto. Specifically, the diameter D1 of a bottom face 31 of the conical frustum, the diameter D2 of a top face 32 facing to the bottom face 31, and the inclination angle θ made by a slope 33 connecting the bottom face 31 and the top face 32 with respect to the bottom face 31 are designed. These bottom face diameter D1, top face diameter D2 and inclination angle θ are determined also by taking the thickness of a support wall 14 and the thickness T of a sealing plate 15 into account.

When the damaged part 11 has reached a back side 10B of the composite material 10, a mortar-shaped concave portion passing through the composite material 10 from the front side 10A to the back side 10B is to be formed to remove the damaged part 11.

Figure 2B:
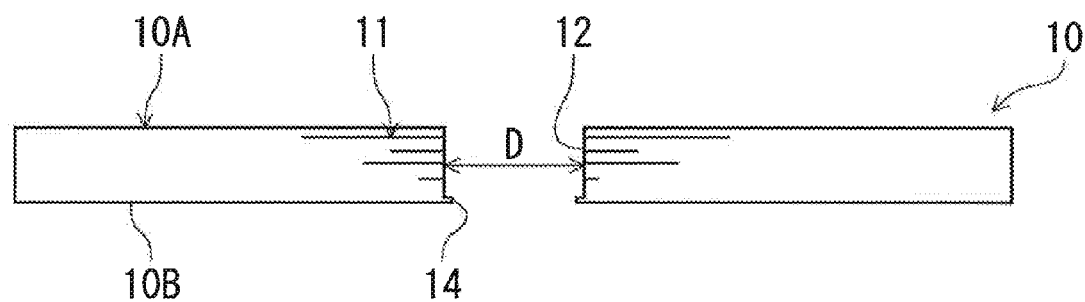

In this embodiment, in order to realize the repair by approaching from one side, a portion of the damaged part 11 is first removed by forming a through hole 12, which passes through the composite material 10 in the thickness direction and has an opening diameter D corresponding to the diameter D2 of the top face 32 of the conical frustum, from the front side 10A. At that time, on the back side 10B of the through hole 12, the support wall 14 is formed integrally with the composite material 10 by not removing, but leaving the support wall 14 protruding inward in the radial direction (step S2 and FIG. 2B). Accordingly, the portion from the top face 32 when the conical frustum 30 is imaged to be in the composite material 10 to the projected area of the top face 32 on the bottom face 31 is removed.

The support wall 14 is formed so as to have an annular shape, the inside and outside of which each are a perfect circle over the entire circumference of the through hole 12. The back side of the support wall 14 is continued to the back side 10B of the composite material 10. The thickness of each of the support wall 14 and the sealing plate 15 is desirable to be thin to a minimum with respect to the thickness of the composite material 10 in order to obtain a concave portion slope described later widely as much as possible. On the other hand, the support wall 14 and the sealing plate 15 are required to have a thickness having strength endurable against evacuation.

The width of the support wall 14 in the diameter direction is arbitrary so long as enabling to remove the damaged part 11 around the back side 10B and being capable in retaining the sealing plate 15 when the evacuation is carried out.

The method of forming the through hole 12 and the support wall 14 is arbitrary. For example, it is possible to form the through hole 12 and the support wall 14 by forming a through hole having a diameter corresponding to the inner diameter of the support wall 14 across the thickness of the composite material 10, and then by enlarging the through hole up to the opening diameter D except the portion where the support wall 14 is formed. Or, it is also possible to form the through hole 12 and the support wall 14 at one time of drilling by use of a tool that has a blade only for drilling an area corresponding to the inner area of the support wall 14 and another blade placed behind the blade in the drilling direction for drilling the area of the opening diameter D.

Figure 2C:
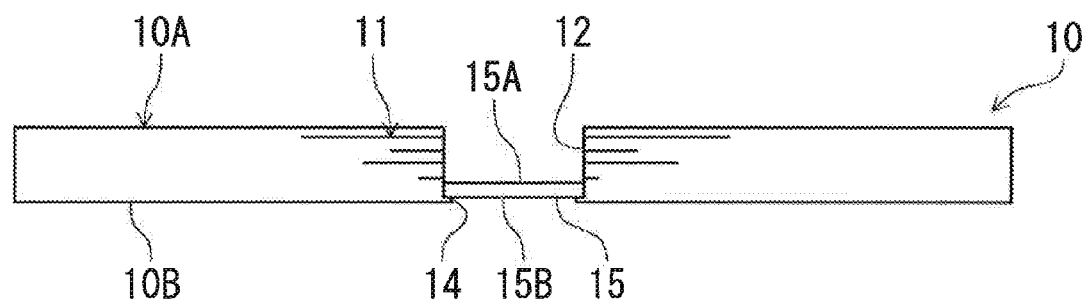

Next, the sealing plate 15, which is a perfect circle having a diameter equivalent to the opening diameter D of the through hole 12, is placed in the back (on the back side 10B) of the through hole 12 by being inserted thereinto from the front side 10A (step S3 and FIG. 2C). The sealing plate 15 is supported on the front side of the support wall 14.

This sealing plate 15 is used for sealing the back side 10B when evacuation is carried out, as described later. The sealing plate 15 is composed of the same CFRP sheet as with the composite material 10. At least one sheet of CFRP is used for the sealing plate 15 depending on the thickness of the sealing plate 15.

The sealing plate 15 is bonded to the support wall 14 on its front side through an adhesive (not shown) that has been applied to the periphery of the sealing plate 15 on its back side before inserted into the through hole 12. The clearance between the sealing plate 15 and the support wall 14 is thereby sealed.

Figure 3A:
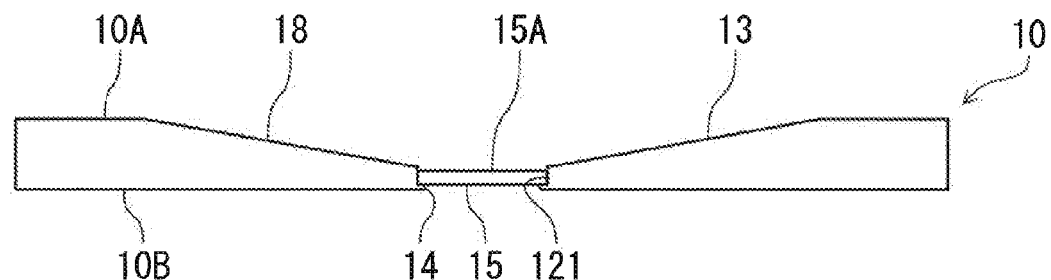
FIGS. 3A to 3D are cross-sectional views showing steps of repairing a composite material.

Then, the whole of the damaged part 11 is removed by scraping off the remains of the portion of a conical frustum 30, in which the damaged part 11 remains, in the step of scarf machining (step S4 and FIG. 3A). This scarf machining forms a concave portion slope 18 extending from the vicinity of the periphery of the front side 15A of the sealing plate 15 toward the front side 10A of the composite material 10 for the reasons of enlarging the area in which the composite material 10 and a repair material 20 described later are bonded to each other, and of relieving stress concentration to the bonded area. The scarf machining is carried out from the front side 10A of the composite material 10 up to the position of the front side 15A of the sealing plate 15. The front side 15A of the sealing plate 15 becomes a face for guiding the tool.

The concave portion slope 18 is inclined at the above inclination angle θ with respect to the back side 10B. The inclination angle θ is determined on the basis of the area of the damaged part 11 and the stress to be applied to the composite material 10, and the radius of the concave portion slope 18 is rendered to be, for example, 10 to 30 times of the thickness of the composite material 10.

Figure 4:
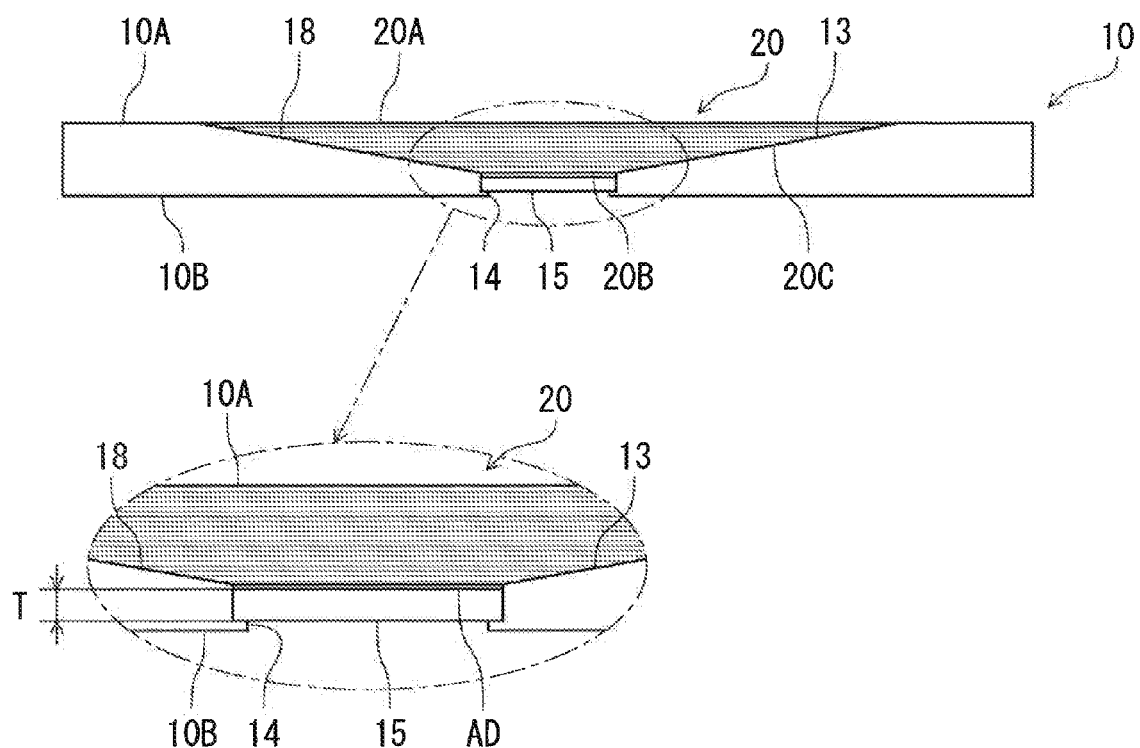
FIG. 4 is a cross-sectional view showing a repaired composite material.

Due to this concave portion slope 18, a mortar-shaped through concave portion 13 having a volumetric capacity larger than that of the through hole 12 is formed. The concave portion slope 18 is formed within the range defined by deducting the thickness of the support wall 14 and the thickness T of the sealing plate 15 from the entire thickness of the composite material 10 (FIG. 4).

Figure 3B:
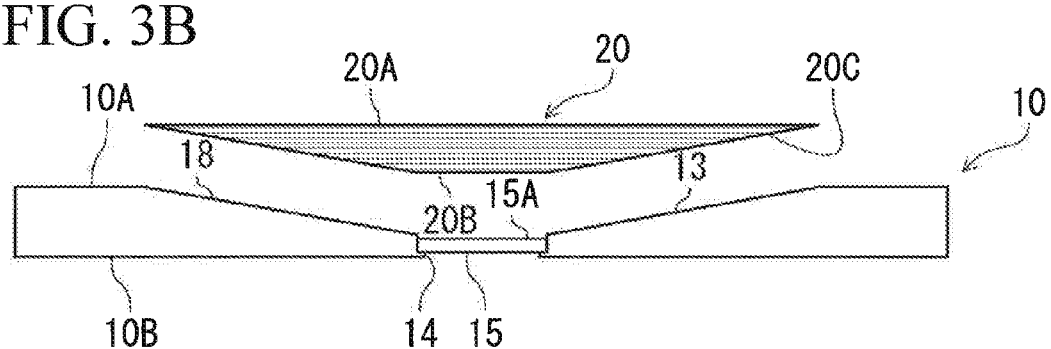

The repair material 20, which is a similar prepreg as being used when the composite material 10 is produced, is placed in the through concave portion 13 (step S5 and FIG. 3B). The prepreg is an intermediate raw material prepared by impregnating sheet-shaped carbon fibers with semi-cured thermosetting resin such as epoxy resin, polyimide or the like, and has good workability because the resin is not cured. Another advantage with the prepreg is such that the properties are stable because the mixing ratio of the fibers and the resin is controlled constant when produced, which results in high product quality in the point of homogeneity. It is possible to use the prepreg produced either through a dry process or through a wet process. Incidentally, a cured prepreg is used for the sealing plate 15.

The repair material 20 is shaped in a conical frustum corresponding to the shape of the through concave portion 13, and the bottom face diameter, top face diameter and inclination angle thereof are equalized with the bottom face diameter D1, top face diameter D2 and inclination angle θ described above. The front side 10A of the composite material 10 and the front side 20A of the repair material 20 are rendered to be substantially flush with each other.

As the repair material 20, a prepreg that is equal in strength to the composite material 10 after cured is chosen for the reason of avoiding stress concentration arising at the border between the repair material 20 and the composite material 10 (base material).

In between the concave portion slope 18 of the composite material 10 and the slope 20C of the repair material 20 facing thereto and also in between the front side 15A of the sealing plate 15 and the back side 20B of the repair material 20 facing thereto, a film or the like (not shown) formed of a thermosetting resin is arranged as an adhesive AD (FIG. 4) for bonding the composite material 10 and the repair material 20 to each other. The form and properties of the adhesive AD do not matter so long as bonding the composite material 10 and the repair material 20 to each other.

Figure 3C:
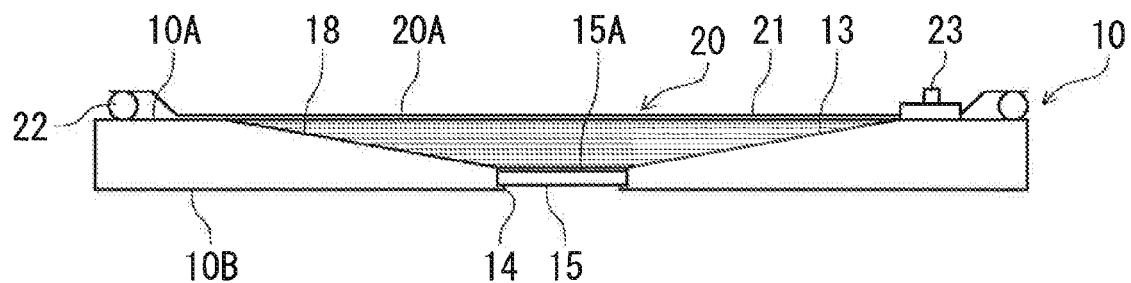

Next, evacuation is carried out by use of an unshown vacuum pump (step S6 and FIG. 3C). At that time, the front side 20A of the repair material 20 and the periphery thereof are covered with a heat-resistant back film 21. The gap between the back film 21 and the front side 10A of the composite material 10 is sealed with a sealant tape 22 disposed on the periphery of the front side 20A of the repair material 20. The sealant tape 22 is formed of a heat-resistant cohesive sealant material in a string shape, and is annularly arranged so as to encompass the repair material 20 on the front side 10A.

Upon activation of the vacuum pump, the gap between the composite material 10 and the repair material 20, which are sandwiched between the back film 21 and the sealing plate 15, is evacuated through a vacuum valve 23 provided in the back film 21. At that time, since the sealing plate 15 is pressed by the support wall 14 due to the differential pressure with respect to atmospheric pressure, the sealing by means of the back film 21 and the sealing plate 15 can be maintained. Since being formed of a similar material as the composite material 10 and therefore has enhanced strength and high product quality in the point of equalized strength, the sealing plate 15 is not deformed when evacuated and allows evacuation to the desired degree of vacuum as applying uniform pressure to the gap. The facing faces of the composite material 10 and the repair material 20 can thereby be brought into close contact to each other having the adhesive AD interposed therebetween, and high bonding quality can thereby be obtained.

Incidentally, the vacuum valve 23 is placed on the composite material 10 positioned between the circumferential rim of the front side 20A of the repair material 20 and the sealant tape 22 to avoid the front side 20A of the uncured repair material 20 from being caved in by being pushed by the vacuum valve 23.

Figure 3D:
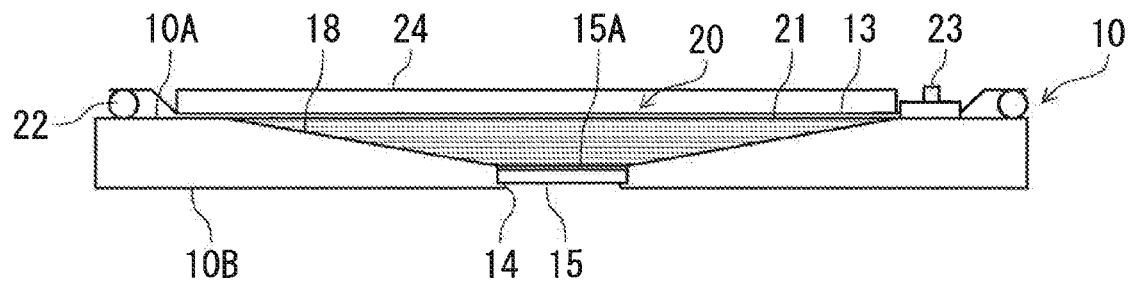

Then, the repair material 20 and the adhesive AD are cured by being heated through an appropriate heating means (step S7 and FIG. 3D). It is desirable to continue the evacuation still in this step.

In this embodiment, the heating is applied by placing a heater mat 24 including a heater on the back film 21. As the heating means, it is possible to use a heater or dryer of the other types. The heating means can be arbitrarily configured regardless of the heat transfer method. It is possible to heat the to-be-repaired structural body in an oven.

When the repair material 20 and the adhesive AD have been cured, the repair material 20 is bonded to the composite material 10. Since the composite material 10 and the repair material 20 have been in close contact evenly with each other because of evacuation, the both members are robustly integrated at even bonding strength.

According to the above procedure, the repair of the composite material 10 is completed. The respective steps of the repair described above are all carried out from the front side 10A of the composite material 10.

The composite material 10 having been repaired is shown in FIG. 4.

In the repair method of this embodiment, the support wall 14 is formed on the back side 10B of the through concave portion 13, which is formed by removing the damaged part 11, and the sealing plate 15 placed thereon serves for sealing the back side 10B of the through concave portion 13. It is therefore not necessary to form an oval-shaped through hole and to bond a patch inserted through the through hole on the back side 10B as with the known method in order to seal the backside 10B of the through concave portion 13. The plane shape of the through concave portion 13 is rendered to be a perfect circle, which can be formed using a tool for general purpose use. Therefore, since the strength investigation for determining the orientation of the oval hole and the troublesome process of forming the oval hole are not needed, the repair time may be shortened and the repair costs may be reduced.

In addition, since the sealing plate 15 is supported on the support wall 14 on its front side in this embodiment, it not necessary to keep a patch, which is hung to be prevented from falling when delivered to the back side, as with the known method. The sealing plate 15 is positioned by means of the front face of the support wall 14 and the inner wall of the through hole 12. The repair work is thereby facilitated.

According to this embodiment, even when any space for allowing a worker to enter the back side 10B (the inside of the structural body) is not available, the repair can be carried out without difficulty. It is therefore possible to accomplish the repair over the entire face of the composite material 10 by approaching from one side (the surface side) without disassembling the structural body. Because of unnecessity of disassembling work, the repair can be carried out at a reduced cost.

The composite material 10 repaired according to the repair method of this embodiment also can benefit from the advantage described above.

It is noted that, instead of determining the bottom face diameter D1, top face diameter D2 and inclination angle θ every time in accordance with the inspection results for the damaged part 11, it is possible to sort the shape, dimension and stress of the damaged part 11 into plural categories, and to prepare a plurality of patterns of the combination of the bottom face diameter D1, top face diameter D2 and inclination angle θ, which conforms the respective categories. Then, an inspection result on the damaged part 11 is to be just checked with the fixed combinations, and the design involved for the repair becomes simple.

Second Embodiment

Next, the second embodiment of the present invention will be described with reference to FIGS. 5A and 5B.

In the second embodiment, an explanation will be given mainly as to the difference as compared with the first embodiment, and elements identical to those of the first embodiment are indicated by identical reference characters, and repeated descriptions are omitted.

Figure 5A:
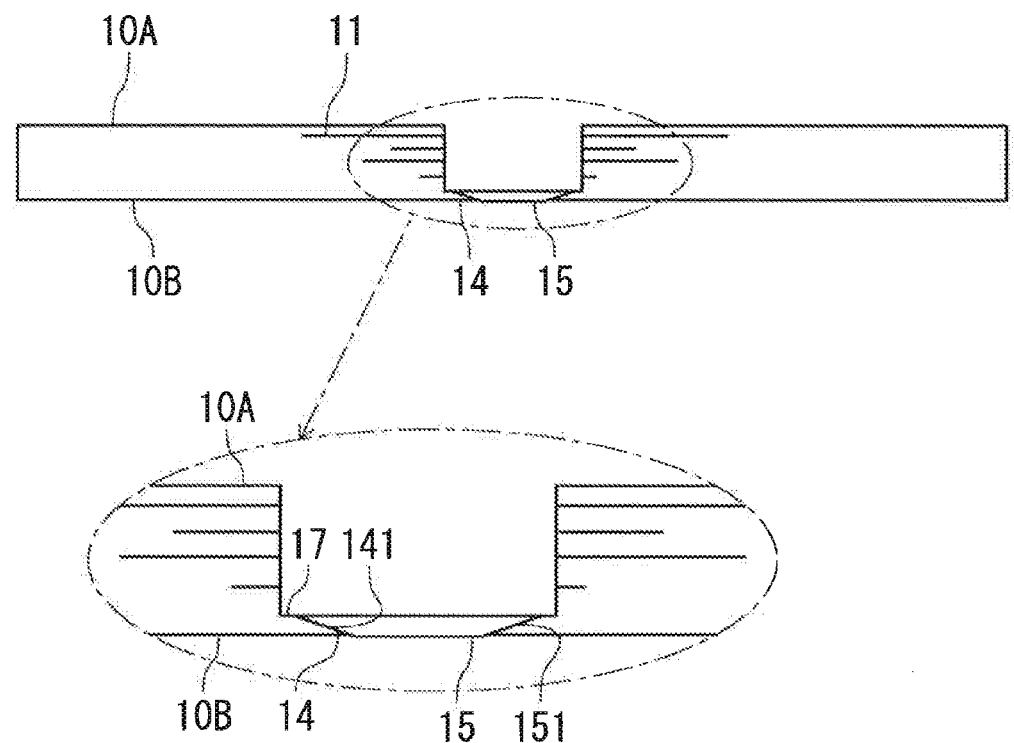
FIGS. 5A and 5B are cross-sectional views showing a method of repairing a composite material and a repaired composite material according to a second embodiment.

As shown in FIG. 5A, a sealing plate 15 has a sealing plate slope 151 formed to be inclined with respect to a back side 10B, and a support wall 14 has a support wall slope 141 formed by following the sealing plate slope 151 in this embodiment.

A through concave portion 13 of this embodiment is configured of a concave portion slope 18 denoted as the first slope, and the support wall slope 141 denoted as the second slope.

The support wall slope 141 is a chamfered edge that follows the sealing plate slope 151. The diameter of the sealing plate slope 151 is enlarged from the back side 10B of the through concave portion 13 toward a front side 10A. The inclination angle of the support wall slope 141 and the sealing plate slope 151 with respect to the back side 10B is not necessarily identical to the inclination angle of the concave portion slope 18 of the through concave portion 13. Likewise, the sealing plate slope 151 is not necessarily continuous with the concave portion slope 18; in the example of FIGS. 5A and 5B, a face 17 parallel to the back side 10B intervenes between the support wall slope 141 and the concave portion slope 18.

It is also possible to cause the sealing plate slope 151 and concave portion slope 18 to be continued at an identical inclination angle. In this case, in the removing step S2, at the same time when a frustum-shaped portion of the composite material 10 is removed, the periphery of the through concave portion 13, which is formed thereby, on its back side 10B is rendered to be the support wall 14. Accordingly, it becomes possible to form the support wall 14 and through concave portion 13 at one time of scarf machining, and the repair can thereby be facilitated.

In the second embodiment, the support wall 14 is formed in the composite material 10, and the support wall slope 141 is further formed in the support wall 14 according to a similar procedure as the first embodiment. By placing the sealing plate 15 having the sealing plate slope 151 formed therein on the support wall 14, the sealing plate slope 151 faces to the support wall slope 141 as shown in FIG. 5A.

Figure 5B:
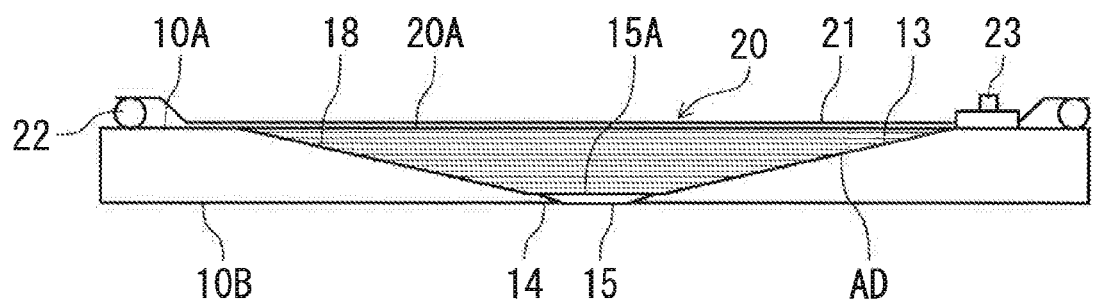

After the repair material 20 is placed on the inside of the through concave portion 13 formed through scarf machining, the composite material 10 is subjected to the evacuation, heating and curing steps as with the first embodiment, by which the repair is completed as shown in FIG. 5B.

The composite material 10 repaired as described above may disperse the stress arising in the composite material 10 because of the support wall slope 141 and sealing plate slope 151. Therefore, even in the case in which the sealing plate 15 cannot be thinned for the reason of securing strength, and the height of bonded face (the concave portion slope 18) between the composite material 10 and the repair material 20, which are scarf jointed, cannot not be secured, stress concentration can be avoided due to stress dispersion achieved by the whole of the support wall slope 141 and concave portion slope 18.

Except described above, the invention may also be practiced by selectively adopting the configuration presented in the above embodiments or by modifying it appropriately into various other configurations not departing from the gist of the invention.

For example, although scarf machining is carried out after the sealing plate 15 has been placed on the back side 10B of the through hole 12, the sealing plate 15 may be placed after the scarf machining has been carried out on the back of forming the through hole 12. At that time, one piece merged from the sealing plate 15 and repair material 20 in advance may be placed in the through concave portion 13.

The repair material placed in the through concave portion 13 is not limited to the above repair material 20. The repair material may be composed of fibers and molten resin. The fibers may be placed in the through concave portion 13 and may be impregnated with the molten resin to be poured into the through concave portion 13.

Although the support wall 14 is continuously formed in an annular shape over the entire circumference in the above embodiments, the invention allows the support wall to be formed in a discontinuous shape in the circumferential direction.

In regard to the support wall and sealing plate in the invention, the specific shape is not required so long as the sealing function is exerted when evacuated.

Likewise, the "frustum" in the invention is not limited to the frustum of a cone, but a frustum of an elliptic cone, or the like is included therein.

It is noted that the composite material of the invention may be applied to various structures besides the skin of a wing of an aircraft. Especially, since the wing of a windmill is assembled in a box shape as with the wing of an aircraft, the composite material may be suitable to be used for an outer plate of the windmill wing.

What is claimed is:

1. A method of repairing a composite material that is formed of fibers and resin in a plate shape and has a to-be-removed frustum-shaped portion having a diameter enlarging from a back side toward a front side, the composite material being bonded with a repair material replacing the removed portion, comprising the steps of:

removing, from the front side, at least a first portion of a top face of the frustum-shaped portion so as to form a through hole that passes completely through the composite material in a thickness direction while leaving a support wall protruding inward in a radial direction from a periphery of the through hole, the first portion extending from the top face so as to include at least a projected area of the top face on a bottom of the frustum-shaped portion;

then sealing the back side by placing a sealing plate on the support wall to close the through hole while the back side is accessible from the front side via the through hole, the sealing plate being inserted from the front side into the through hole formed by the removing step;

then placing the repair material through an adhesive on the composite material where the frustum-shaped portion has been removed; and then evacuating in a state in which the front side is sealed.

2. The method of repairing a composite material according to claim 1, wherein the first portion is removed at the step of removing; and a remaining portion of the frustum-shaped portion is removed after the sealing plate has been placed on the support wall.

3. The method of repairing a composite material according to claim 1, wherein the first portion is a cylindrical portion.

4. The method of repairing a composite material according to claim 1, wherein the sealing plate has a sealing plate slope having a diameter enlarging from the back side toward the front side; and the support wall has a support wall slope facing to the sealing plate slope.

5. The method of repairing a composite material according to claim 4, wherein as well as removal of a frustum-shaped portion of the composite material, the periphery of the frustum-shaped through hole formed by the removal on the back side is rendered to be the support wall.

6. The method of repairing a composite material according to claim 4, wherein the sealing plate slope and a slope of the frustum-shaped portion continue at an identical inclination angle.

7. The method of repairing a composite material according to claim 1, wherein the composite material constitutes a skin of an aircraft.

8. The method of repairing a composite material according to claim 1, wherein an opening diameter of the through hole is equivalent to a diameter of the top face of the frustum-shaped portion, the frustum-shaped portion being formed by scarf machining.

9. The method of repairing a composite material according to claim 1, wherein the support wall is formed integrally with the composite material.

10. The method of repairing a composite material according to claim 1, wherein the support wall is formed over an entire circumference of the through hole.

11. The method of repairing a composite material according to claim 1, wherein the support wall is formed so as to have an annular shape, the inside and outside of which each are a circle.

12. The method of repairing a composite material according to claim 1, wherein the sealing plate is composed of at least one sheet of CFRP.

13. The method of repairing a composite material according to claim 1, wherein the sealing plate is a perfect circle.

14. The method of repairing a composite material according to claim 1, wherein the evacuating is conducted only from the front side.

15. The method of repairing a composite material according to claim 1, wherein the sealing plate is placed on the support wall without previously installing a patch inserted through the through hole on the back side to close the through hole.

* * * * *